(No Model.)  4 Sheets—Sheet 1.

J. IRELAND.
SPEAKING TUBE.

No. 269,578.  Patented Dec. 26, 1882.

Witness,
M. S. Norton
F. R. Tibbitts

Inventor,
Joseph Ireland,
By Geo. W. Tibbitts Atty.

(No Model.)  4 Sheets—Sheet 2.
J. IRELAND.
SPEAKING TUBE.
No. 269,578. Patented Dec. 26, 1882.
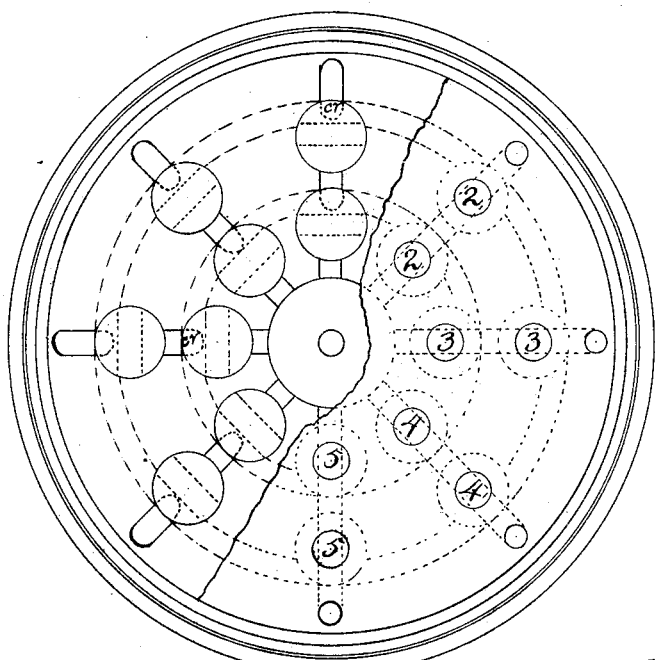
Fig. 4.
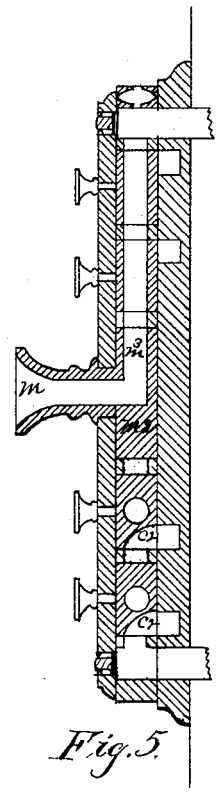
Fig. 5.
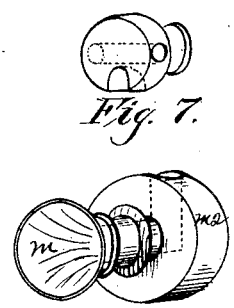
Fig. 7.
Fig. 8.
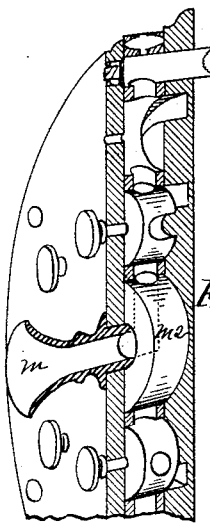
Fig. 6.
Witness,
M. G. Norton
G. W. Tibbitts
Inventor,
Joseph Ireland
By Geo. W. Tibbitts Atty.

(No Model.) 4 Sheets—Sheet 3.
J. IRELAND.
SPEAKING TUBE.
No. 269,578. Patented Dec. 26, 1882.
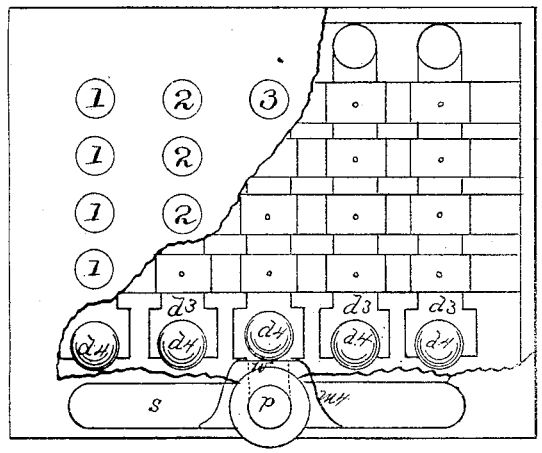
Fig. 9.
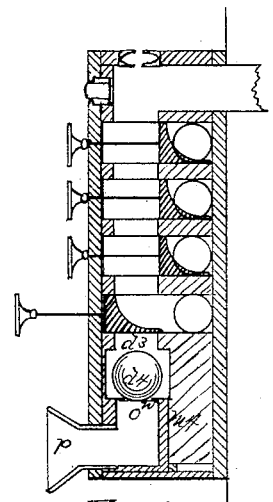
Fig. 10.
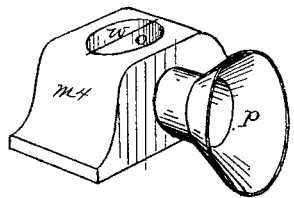
Fig. 11.
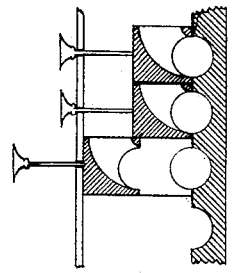
Fig. 10½.
Witness,
M. G. Norton
G. W. Tibbitts
Inventor,
Joseph Ireland.
By Geo. W. Tibbitts, Atty.

(No Model.)  4 Sheets—Sheet 4.

J. IRELAND.
SPEAKING TUBE.

No. 269,578. Patented Dec. 26, 1882.

Witness.
M. G. Norton.
F. R. Gibbs.

Inventor.
Joseph Ireland
By Geo. W. Tibbetts Atty.

UNITED STATES PATENT OFFICE.

JOSEPH IRELAND, OF CLEVELAND, OHIO.

SPEAKING-TUBE.

SPECIFICATION forming part of Letters Patent No. 269,578, dated December 26, 1882.

Application filed June 3, 1882. (No model.)

*To all whom it may concern:*

Be it known that I, JOSEPH IRELAND, of Cleveland, in the county of Cuyahoga and State of Ohio, have invented certain new and useful Improvements in Oral Annunciators, of which the following is a specification.

These improvements relate to the construction and arrangement of the several parts comprising an exchange for oral annunciators, in which the speaking-tubes are made interchangeable, whereby any one or more rooms may be put into immediate communication with any other one or more rooms at one and the same time, the object being to simplify and cheapen the construction.

Figure 1:
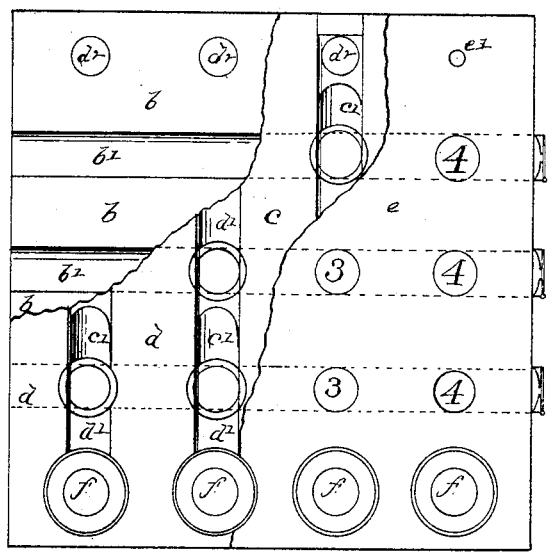
Figure 2:
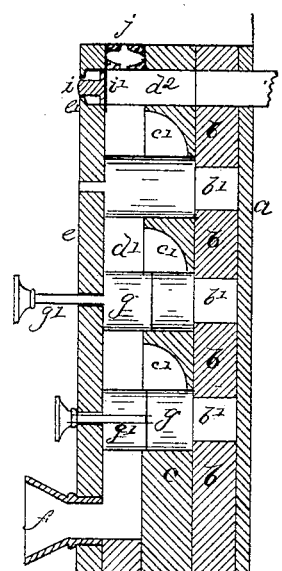
Figure 3:
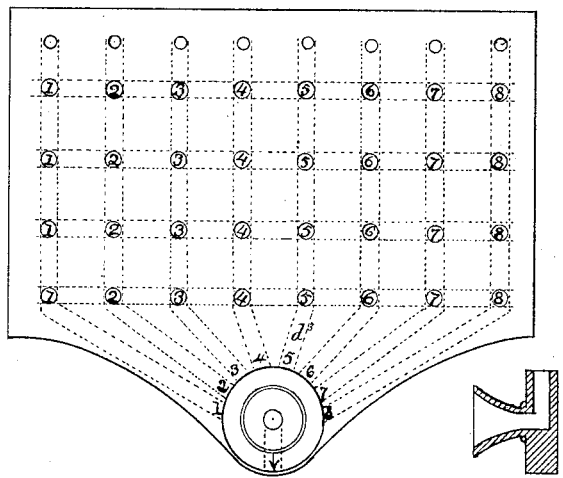
Figure 12:
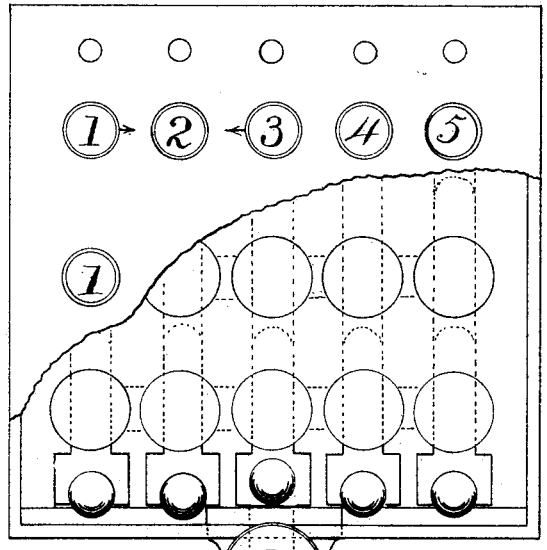
Figure 13:
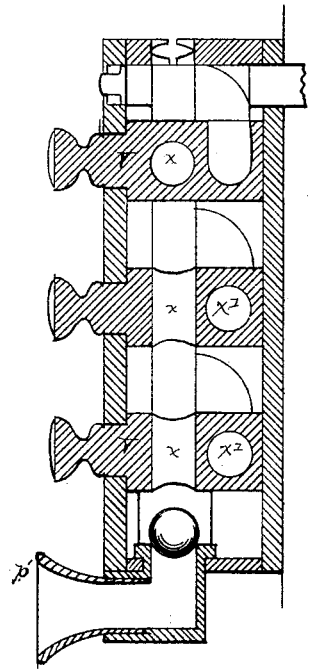
Figure 15:
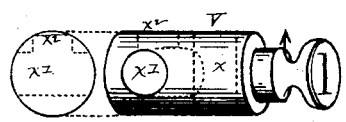
Figure 14:
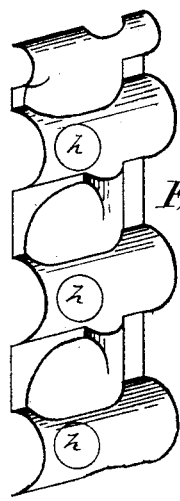

The accompanying drawings illustrate four modifications for constructing the devices constituting my improvements. The drawings comprise three sheets. Sheet 1, Figure 1 is a front elevation with parts broken out, and Fig. 2 is a vertical section of the first modification, and Fig. 3 is a front elevation of the second modification. Sheet 2, Fig. 4 is a front elevation of a circular form, with parts broken out. Fig. 5 is a vertical section of same. Fig. 6 is a sectional view, showing construction of interior; and Figs. 7 and 8 are detached views of a rotary valve and rotary mouth-piece in the third modification. Sheet 3, Fig. 9 is a front elevation with parts broken out. Fig. 10 is a vertical section of same. Fig. 11 is a detached view of a sliding mouth-piece in the fourth modification. Sheet 4, Fig. 12 is a front elevation with parts broken out. Fig. 13 is a vertical section of same. Fig. 14 is a detached view of a pressed metal piece used to form grooves or channels and valve-cavities. Fig. 15 is a detached view of a rotary valve for same in the fifth modification. These modifications show various methods of constructing my invention in cheap, compact, and convenient forms.

In Figs. 1 and 2 the device is shown as constructed of wood, as follows: $a$ is a wood base or back, upon which are laid horizontal strips $b\ b$, at short distances apart, making square grooves or channels $b'$. Over said strips is laid a board, $c$, and upon said board $c$ is laid another row of strips, $d\ d$, at intervals, perpendicularly or transversely to the strips $b\ b$, making thereby transverse grooves or channels $d'$. The ends of said grooves are closed by blocks and the whole covered by the ends and sides of the outside casing. The said grooves $b'\ b'$ and $d'\ d'$ are connected together by round holes bored through the board $c$, of somewhat larger diameter than the breadth of grooves. There is also a place scooped out in the board $c$, (seen at $c'$,) for a purpose hereinafter shown. Over the said strips $d\ d$ is laid a face or front piece, $e$, inclosing the front grooves and furnishing a finishing surface for the outside casing. The perpendicular grooves $d'$ are connected by branch tubes $d^2$ in the top, which pass out at the back to where they are to be connected to the speaking-tubes which lead to the several rooms. The lower ends of said grooves $d'$ are connected with open mouthpieces $f\ f$, arranged along the lower front. In the aforesaid round holes which extend through to the front face-piece are placed round plug-valves $g\ g$, which play back and forth in said holes for closing or opening communication between the several channels, as may be required, the said valves being operated by push-pins $g'$, extending through the front and provided with knobs, on the faces of which are marked the numbers in their order. At the top and along the front of the casing are made openings $e'$, connecting with the tubes $d^2$ at their junction with the grooves or channels $d$, in which are placed indicators, consisting of short pins $i$, having disk-heads the size of tubes $d^2$, the pin being smaller and playing through the front opening. Across the opening, on the inside, is secured a flexible covering, $i'$, the purpose of which is to prevent the escape of air or sound, but will yield to the force of the wind blown by the caller to throw out the indicator. In the top of the case, at the junction also of the tubes $d^2$ with the grooves $d$, are placed whistles $j$, for the purpose of sounding a signal when the wind is blown by the caller. The operation of this is as follows: The caller announces to the attendant that he desires to talk with the occupant of another room. The attendant withdraws the valve of one of the column of numbers from which the call comes, and also the valve of the number called for in the column of said numbers. This puts the speaking-tubes of the two rooms in communication.

In Fig. 3 is shown the same construction and arrangement of grooves and valves; but the perpendicular grooves $d$ are connected with radial grooves $d^3$ in the lower part of the casing, concentrated to connect with a single mouth-piece. This is for the purpose of arranging the tubes and valves in a more compact form without the interference of the mouth-pieces, and also enables a larger number of tubes to be constructed in small compass.

In Figs. 4, 5, and 6 is shown a modified construction of grooves and valves in a circular form, the front grooves being arranged in radial form, terminating toward a common center, while the rear or counter grooves are made in circular form, and crossing the others at regular intervals. The valves in this construction are rotary, and are located on the center line of the radial grooves, but within the circle of the circular grooves, in such a manner that a quarter-turn of the valves will open and close the communications between grooves. The revolving valves have a straight opening through them, which connects with the radial tubes, when turned in line with them. They also have at one side a cavity, $c^2$, by which communication is made between the radial and curved grooves, when turned in the position seen in Fig. 4. The mouth-piece $m$ is attached to a revolving disk, $m^2$, fitted into a round chamber at the center of the system of radial tubes. The said disk $m^2$ has a radial opening, $m^3$, which connects with the mouth-piece opening, and which may be turned so as to connect with either of the said radial grooves. These grooves and valves may be constructed of wood in layers like that of Fig. 1, and the periphery provided with indicators and whistles. The rotary valves have pins and knobs for turning them with, which are numbered in like manner to those of Fig. 1. The operation of this is like that of Fig. 1, the difference being that the valves are rotated instead of being pushed and pulled in or out.

Fig. 9 shows another modification of grooves and valves, in which the valves are made with a beveled back, and are made to slide in square chambers connecting the grooves, the changes being made by drawing out the valves. The principal difference in this construction consists of a sliding mouth-piece, $p$, which is so arranged that it can be slid along beneath the lower ends of the perpendicular tubes for connecting it with them at will. The lower ends of these tubes are provided with an enlarged chamber, $d^3$, with an opening in the bottom closed by a ball-valve, $d^4$. The mouth-piece is attached to a sliding block, $m^4$, having a perpendicular opening, $o$, connected with the mouth-piece $p$, and has a fine wire or thread, $w$, stretched across the top, the purpose of which is to raise the ball and hold it up when the block is under the tube, to open communication therewith. In the lower front of the case is a slot, $s$, in which the mouth-piece $p$ slides.

Figs. 12, 13, 14, and 15 show another modification of grooves and valves, in which the valves are rotary plugs of wood, having in the back part a direct hole through it, with a counter-opening, whereby a change of current may be made to the right or left by making quarter-turns of said valves. The grooves or channels are made of sheet metal pressed or struck up, forming one half-groove, two of which being placed together form the complete perpendicular grooves and the valve-cavities. The counter or horizontal grooves or channels are made by the holes $h$ in the said metal pieces meeting when the said complete metal pieces are placed side by side in the casing joined by short tubes. The valves $v$ have a direct opening, $x$, through them near the front end, which connects with the perpendicular grooves or channels, while the rear part has a transverse opening, $x'$, with a counter-opening, $x^2$, connecting therewith. The object of this arrangement is designed to enable two or more communications to be made in the same horizontal row. The valves are provided with pointers $\longrightarrow$ for indicating the direction of the counter-opening $x^2$ to assist the attendant in making connections. This would be done in the following manner: For instance, No. 1 desires to talk with No. 3. The communication is made by turning the pointers of Nos. 1 and 3 toward each other, thus $\rightarrow \leftarrow$. This brings the counter-openings $x^2$ in horizontal line and open toward each other, thereby making open communication between speaking-tubes 1 and 3, and leaving 4, 5, and 6 free for a like connection, if desired. The lower ends of the perpendicular grooves have the enlarged chambers and ball-valves like Fig. 9, and the case is provided with a sliding mouth-piece, $p'$, sliding in a slot in the bottom of the case.

Fig. 10½ is a simple modification of Fig. 10, wherein the slide-valves have one half of the horizontal groove made in its rear end, while the other half is made in the back board.

I am aware that it is old to have the tubes of a signaling system terminate in a common chamber provided with a plug having a tube which may be turned against the end of any of the signaling-tubes, and to that I make no claim.

Having described my invention, I claim as follows:

1. In an annunciator, the combination, with a case provided with valve and speaking-tube openings, of blocks or sections arranged within the case, substantially as described, to form main, secondary, and intermediate passages, which are connected with one another and to the openings in the case, for the purpose set forth.

2. In an annunciator, the combination, with a case provided with valve and speaking-tube openings, of blocks or sections arranged within the case, substantially as described, to form main, secondary, and intermediate passages, which are connected to one another and to the openings in the case, and valves within the intermediate passages, for the purpose set forth.

3. An annunciator having speaking-tubes, secondary tubes connected to the speaking-tubes, valves placed at the intersection of the speaking and secondary tubes, a chamber or passage in which all the speaking-tubes enter, and a mouth-piece arranged in said chamber or passage, and adapted to have its inner opening shifted to the open ends of the speaking-tubes, all combined and arranged substantially as described.

4. An annunciator having speaking-tubes, secondary tubes connected to the speaking-tubes, valves placed at the intersection of the speaking and secondary tubes, a chamber beneath the speaking-tubes, which open therein, and a mouth-piece in said chamber and adapted to be moved beneath the end of the speaking-tubes, substantially as described.

5. In an annunciator, the combination, with the speaking-tubes having a valve in their lower ends, of a passage below the lower ends of the tubes, and a mouth-piece having means, substantially as described, for elevating the valve, when moved beneath the ends of the tubes.

JOSEPH IRELAND.

Witnesses:
    E. W. LAIRD,
    GEO. W. TIBBITTS.